US009329857B1

(12) United States Patent
Troyanovsky

(10) Patent No.: US 9,329,857 B1
(45) Date of Patent: May 3, 2016

(54) SYSTEM, METHOD, AND COMPUTER PROGRAM FOR GENERATING CONFIGURATION DATA TREES ASSOCIATED WITH A PLURALITY OF SOURCE FILES

(71) Applicant: Amdocs Software Systems Limited, Dublin (IE)

(72) Inventor: Alexander Troyanovsky, Gan-Yavne (IL)

(73) Assignee: Amdocs Software Systems Limited, Dublin (IE)

( * ) Notice: Subject to any disclaimer, the term of this patent is extended or adjusted under 35 U.S.C. 154(b) by 0 days.

(21) Appl. No.: 14/203,388

(22) Filed: Mar. 10, 2014

Related U.S. Application Data

(60) Provisional application No. 61/802,776, filed on Mar. 18, 2013.

(51) Int. Cl.
*G06F 9/44* (2006.01)
(52) U.S. Cl.
CPC ........................................ *G06F 8/71* (2013.01)
(58) Field of Classification Search
CPC ........................................................ G06F 8/71
USPC ................................................. 717/120–123
See application file for complete search history.

(56) References Cited

U.S. PATENT DOCUMENTS

| 5,649,200 | A  | * | 7/1997 | Leblang et al. | ................ | 717/122 |
| 6,757,678 | B2 | * | 6/2004 | Myllymaki | ........................ | 707/6 |
| 7,899,883 | B2 | * | 3/2011 | Rasmussen et al. | ........... | 709/217 |
| 7,984,388 | B2 | * | 7/2011 | Dieberger et al. | .............. | 715/853 |

OTHER PUBLICATIONS

Chou et al., "A Software Product Model Emphasizing Relationships", 2004, Journal of Information Science and Engineering, pp. 349-377.*
Fraser et al., "An Editor for Revision Control", 1987, ACM, pp. 277-295.*

* cited by examiner

*Primary Examiner* — Ted T Vo
(74) *Attorney, Agent, or Firm* — Zilka-Kotab, PC

(57) ABSTRACT

A system, method, and computer program product are provided for generating a configuration data tree associated with a plurality of source files. In use, a load of a configuration data tree associated with a plurality of source files is initiated. Further, different versions of the plurality of source files are identified. Additionally, the different versions of the plurality of source files are merged to produce a single configuration data tree, wherein one node in the single configuration data tree is capable of representing a plurality of nodes associated with the different versions of the plurality of source files. Moreover, displayable data associated with the single configuration data tree is generated.

19 Claims, 5 Drawing Sheets

SYSTEM, METHOD, AND COMPUTER PROGRAM FOR GENERATING CONFIGURATION DATA TREES ASSOCIATED WITH A PLURALITY OF SOURCE FILES

CLAIM OF PRIORITY

This application claims the benefit of U.S. Provisional Application No. 61/802,776, filed Mar. 18, 2013, the entire contents of which are incorporated herein by reference.

FIELD OF THE INVENTION

The present invention relates generally to optimizing data structures that represent complex hierarchical configuration data.

BACKGROUND

Typical configuration management tools only generally provide the ability for reading a configuration data tree, where the data for the tree structure is provided from a single source file. In some cases, however, multiple versions of the same source file include unique and/or updated data that should be used as part of the data tree.

One solution would be to create a separate configuration tree data structure for each required versioning permutation. This solution, however, would be non-scalable and very inefficient as the tool would have to keep multiple configuration trees in memory with large amounts of unnecessarily duplicated data.

There is thus a need for addressing these and/or other issues associated with the prior art.

SUMMARY

A system, method, and computer program product are provided for generating a configuration data tree associated with a plurality of source files. In use, a load of a configuration data tree associated with a plurality of source files is initiated. Further, different versions of the plurality of source files are identified. Additionally, the different versions of the plurality of source files are merged to produce a single configuration data tree, wherein one node in the single configuration data tree is capable of representing a plurality of nodes associated with the different versions of the plurality of source files. Moreover, displayable data associated with the single configuration data tree is generated.

DETAILED DESCRIPTION

Figure 1:
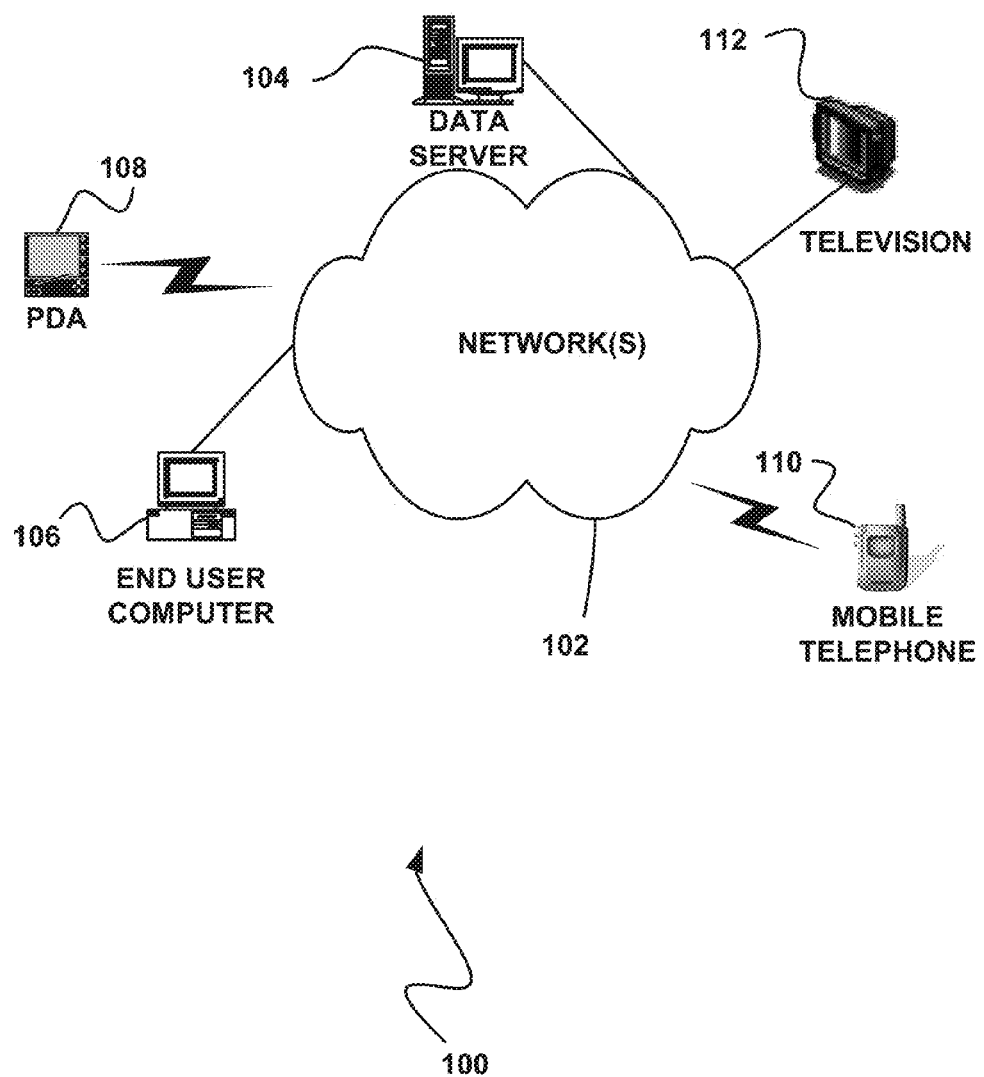
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
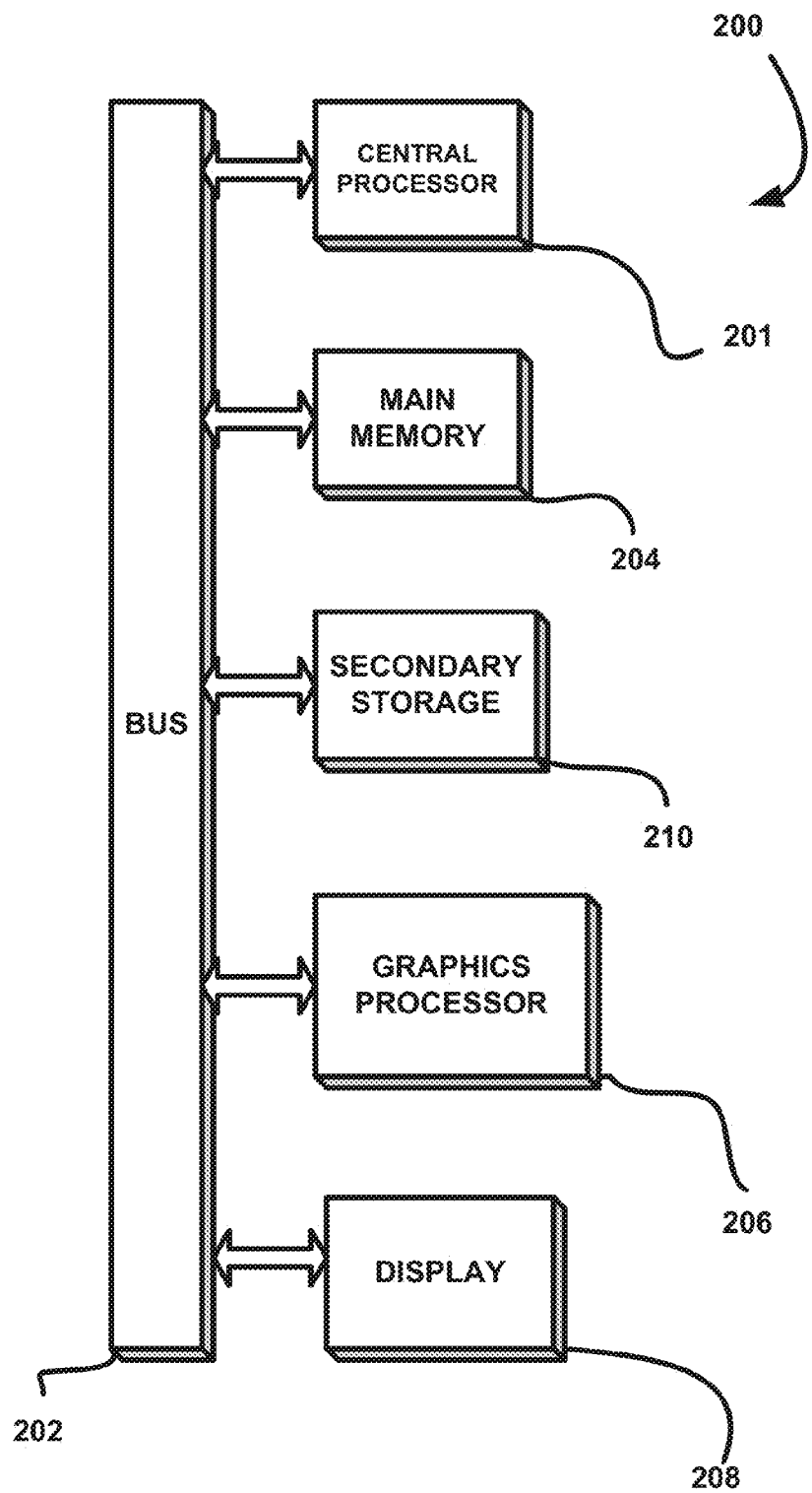
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
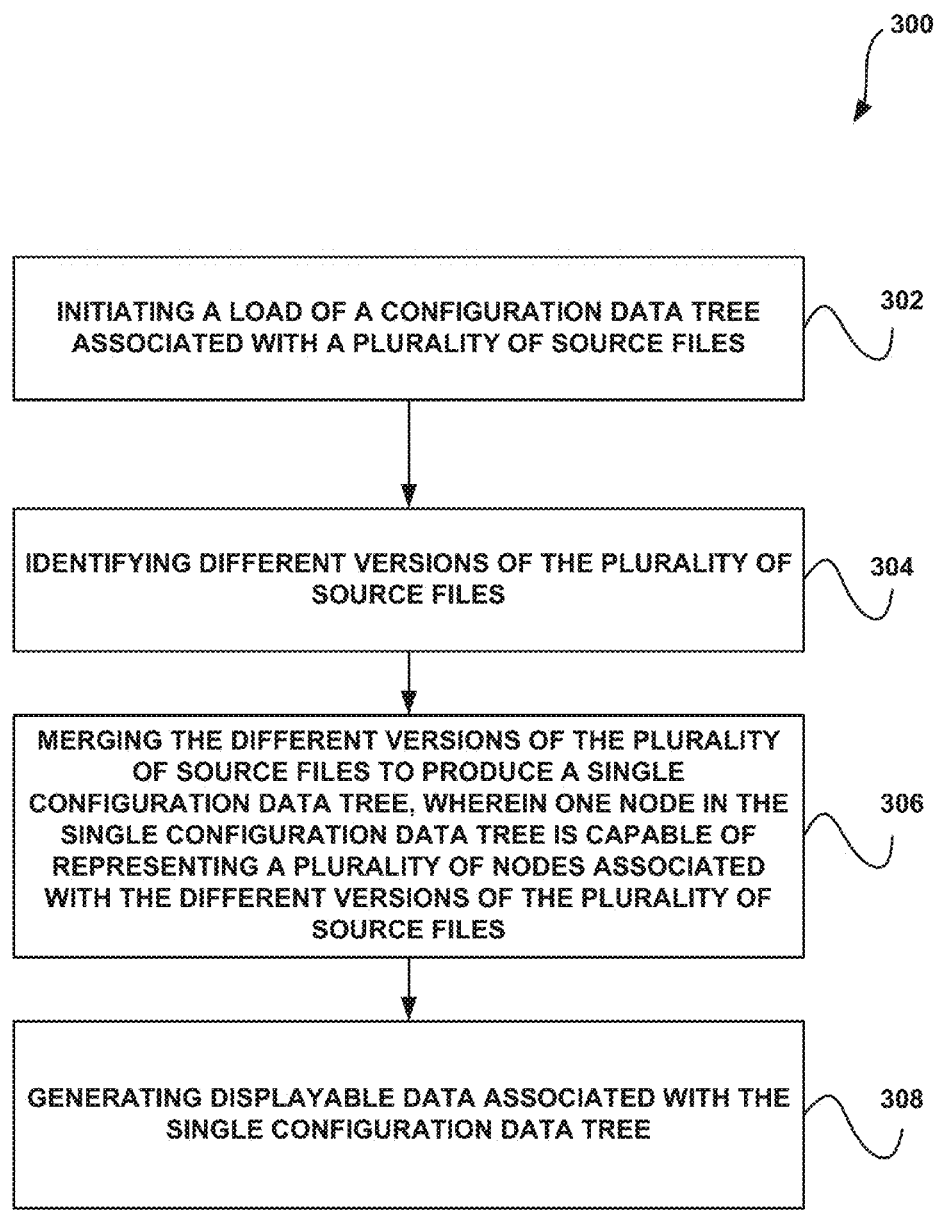
FIG. 3 illustrates a method for generating a configuration data tree associated with a plurality of source files, in accordance with one embodiment.

FIG. 3 illustrates a method 300 for generating a configuration data tree associated with a plurality of source files, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, a load of a configuration data tree associated with a plurality of source files is initiated. See operation 302. In the context of the present description, a configuration data tree refers to any data tree structure associated with configuration data and/or files. Further, in the context of the present description, a data tree refers to any hierarchical tree structure (e.g. with a root value and subtrees of children, represented as a set of linked nodes, etc.).

The loading of the configuration data tree may be initiated in different ways. For example, in one embodiment, a user may initiate the loading utilizing a user interface. In one embodiment, the user interface may include an interface associated with a configuration tool.

Further, in one embodiment, loading the configuration data tree may be initiated by selecting one or more source files (e.g. utilizing a user interface, etc.). For example, in one embodiment, a user may be presented with a plurality of source files from which to select. As an option, the user may select one or more versions of a source file.

The sources files may include any source file capable of being used to generate the configuration data tree. For example, in one embodiment, the source files may include a plurality of configuration files. Additionally, in one embodiment, the source files may include a plurality of different versions of the same source file. For example, in one embodiment, a first source file of a first version may be an older version of a second source file of a second version, etc.

As shown further, different versions of the plurality of source files are identified. See operation 304. In one embodiment, the different versions of the source file may be identified automatically.

For example, in one embodiment, the different versions of the source files may be identified based on an extension. In another embodiment, the different versions of the source files may be identified based on a file name. In another embodiment, the different versions of the source files may be identified based on metadata associated with the source files.

In yet another embodiment, the different versions of the source file may be identified manually. For example, in one embodiment, a user interface may be utilized to identify different versions of the source files. As an option, a user may be presented with a plurality of source files from which to choose. In one embodiment, the different source files may include different versions of the same source file (e.g. older versions of the same source file, etc.).

As shown further in FIG. 3, the different versions of the plurality of source files are merged to produce a single configuration data tree. In this case, one node in the single configuration tree is capable of representing a plurality of nodes associated with the different versions of the plurality of source files. See operation 306.

In other words, the different versions of the plurality of source files may be merged to produce the single configuration data tree without duplicated nodes associated with the different versions of the plurality of source files. Additionally, in one embodiment, the different versions of the plurality of source files may be merged to produce the single configuration data tree without duplicated values associated with the different versions of the plurality of source files.

For example, when a configuration tree is loaded into memory from source files, different versions of the same source file may be merged to produce a single tree where there are no duplicated nodes and values. In one embodiment, a node and/or value may be created only if the node and/or value exist in at least one of the versions of a source file. If a node and/or value exist in more than one version of the source file, only one node and/or value may be present in the single configuration data tree.

In one embodiment, a condition associated with the node may reflect the versions of the source file where the node and/or value exist. In one embodiment, the condition may include metadata associated with the versions of the source file where the node and/or value exist.

With further reference to FIG. 3, displayable data associated with the single configuration tree is generated. See operation 308. The displayable data generated may include any data associated with the single configuration tree that is capable of being displayed.

For example, in one embodiment, the displayable data may include data associated with a tree structure. In another embodiment, the displayable data may include data associated with nodes. In another embodiment, the displayable data may include data associated with one or more of the source files. In another embodiment, the displayable data may include a user interface.

In one embodiment, the method 300 may further include displaying the single configuration tree. For example, in various embodiments, data associated with the source files may be displayed as a tree structure. Further, in one embodiment, the single configuration tree may include an interactive structure such that a user can access data associated with nodes of the configuration tree.

Additionally, in one embodiment, the user may be able to manipulate and/or edit the configuration tree. In one embodiment, modifying the configuration tree may cause the source files to change. In addition, in one embodiment, a new source file based on the single configuration tree may be capable of being created (e.g. utilizing a user interface, by saving the current configuration tree, etc.).

With further reference to FIG. 3, in one embodiment, the method 300 may include identifying nodes that exist in at least one of the different versions of the plurality of source files. In this case, the single configuration data tree may include the nodes that exist in at least one of the different versions of the plurality of source files. Further, in one embodiment, the single configuration data tree may include values associated with the nodes that exist in at least one of the different versions of the plurality of source files.

Additionally, in one embodiment, the method 300 may include identifying duplicate nodes that exist in at least two of the different versions of the plurality of source files. In this case, data associated with the identified duplicate nodes that exist in the at least two of the different versions of the plurality of source files may be merged to produce the single configuration data tree (e.g. along with non-duplicate data, etc.).

Furthermore, in one embodiment, a condition associated with the identified duplicate nodes that exist in the at least two of the different versions of the plurality of source files may be set to indicate at least one source file origin. In another embodiment, a condition associated with the identified duplicate nodes that exist in the at least two of the different versions of the plurality of source files may be set to indicate at least one value associated with the at least one source file origin. In one embodiment, the condition may include metadata associated with an origin source file, node, and/or data.

As one example, in one embodiment, identifying the different versions of the plurality of source files may include identifying a first source file associated with a first version and a second source file associated with a second version. In this case, the first source file associated with the first version may be a different version of the second source file associated with the second version. Additionally, data associated with one or more first duplicate nodes that exist in the first source file associated with the first version and the second source file associated with the second version may be identified.

Further, one or more second nodes may be created for the single configuration data tree. In this case, each of the one or more second nodes may correspond to a single merged node representing one of the one or more first duplicate nodes. In one embodiment, a condition of the one more second nodes may indicate a source file location associated with the first source file and the second source file.

In another embodiment, data associated with one or more first nodes that exist in only one of the first source file associated with the first version or the second source file associated with the second version may be identified. In this case, one or more second nodes may be created for the single configuration data tree, where each of the one or more second nodes corresponds to a single node representing the one or more first nodes. In this case, a condition of the one more second nodes may indicate a source file location associated with one of the first source file or the second source file.

Still yet, in one embodiment, the method 300 may include displaying data associated with the single configuration data tree including at least one of data corresponding to the first source file associated with the first version or data corresponding to the second source file associated with the second version, in response to a user input requesting to view the first version, the second version, or both the first version and the second version. Thus, a user may select to view all information included in the single configuration data tree, the information associated with a specific version, or the information associated with multiple versions.

As an example, if a configuration tree has various branches from different source files and each source file has several versions, then, from the user perspective, the user may view the tree that corresponds to a combination of versions of the source files. For example, the user might want to see a view where the source file A is in version 1, file B is in version 1, and file C is in version 4. This is called versioning context.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
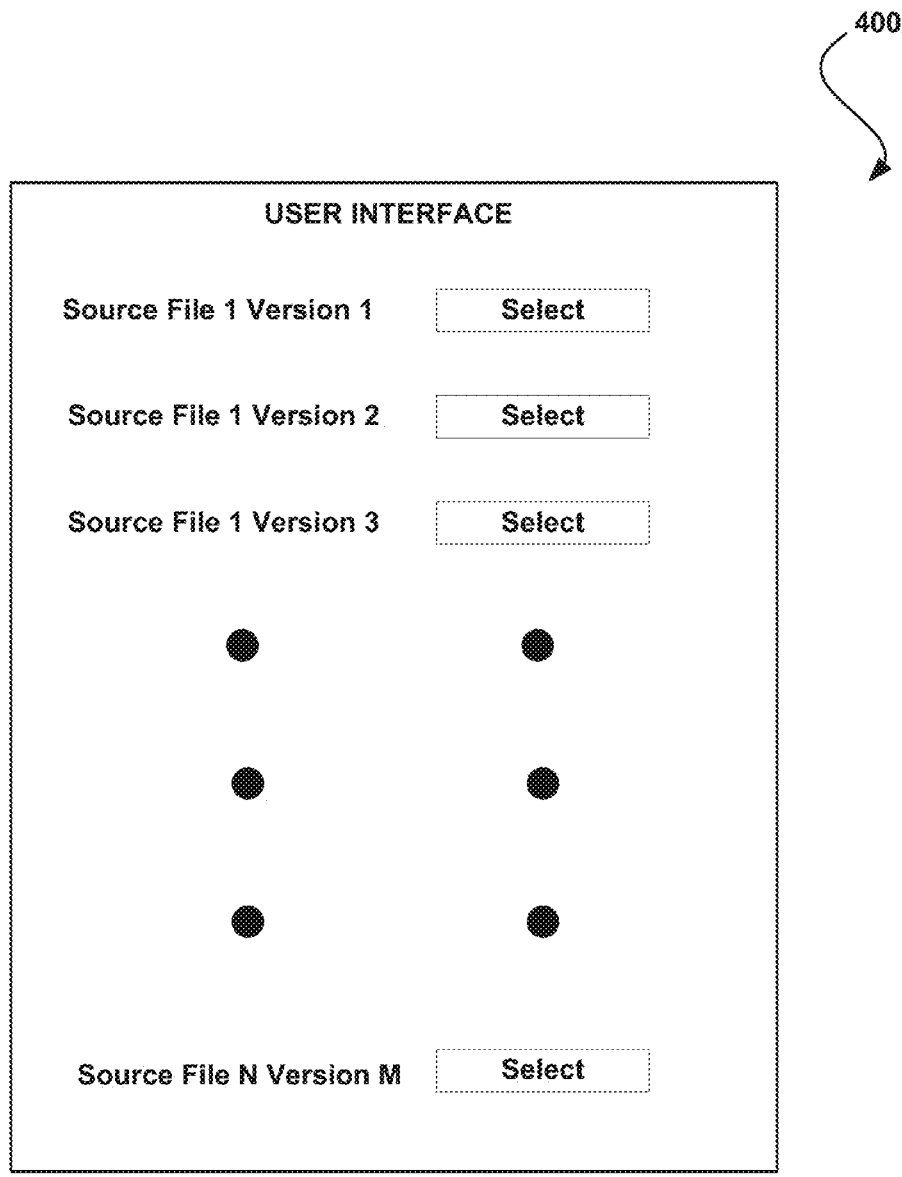
FIG. 4 illustrates an interface for facilitating generation of a single configuration data tree from a plurality of source files, in accordance with one embodiment.

FIG. 4 illustrates an interface 400 for facilitating generation of a single configuration data tree from a plurality of source files, in accordance with one embodiment. As an option, the interface 400 may be implemented in the context of the details of FIGS. 1-3. Of course, however, the interface 400 may be implemented in the context of any desired environment. Further, the aforementioned definitions may equally apply to the description below.

As shown, the interface 400 may be capable of displaying a plurality of source files of different versions. In one embodiment, a user may utilize the interface 400 to select one or more source files to be used to create a configuration data tree. Further, in one embodiment, the interface 400 may be utilized to select a primary source file for the configuration data tree.

It should be noted that the interface 400 is a generalized interface, in accordance with one embodiment. In various embodiments, any interface may be utilized with varying degrees of functionality and complexity.

In one embodiment, a user may utilize the interface 400 or another interface to initiate a load of a configuration data tree associated with a plurality of source files. When a configuration tree is loaded into memory from source files, different versions of the same source file may be merged to produce a single configuration data tree where there are no duplicated nodes and values.

In one embodiment, a node and/or value may only be created if they exist in at least one version of a source file. If a node and/or value exist in more than one version, there may still be only one node and/or value in memory, but its condition may reflect the versions where it exists. Thus, a single configuration data tree may be generated that represents a scalable solution that minimizes a required memory footprint by ensuring that no data is duplicated.

In one embodiment, the single configuration data tree may be configured such that each node has an existence condition associated therewith. Further, in one embodiment, only in the context where the existence condition is evaluated to be logical true, the node exists in the data tree and may be presented to the user. Otherwise, the node may be hidden.

Further, in one embodiment, every attribute value associated with a node may include a list of condition/value pairs (e.g. <condition,value>, etc.). When an attribute's value is to be presented to the user, in one embodiment, the value with the condition that evaluates to a logical true in the given versioning context may be selected.

Figure 5:
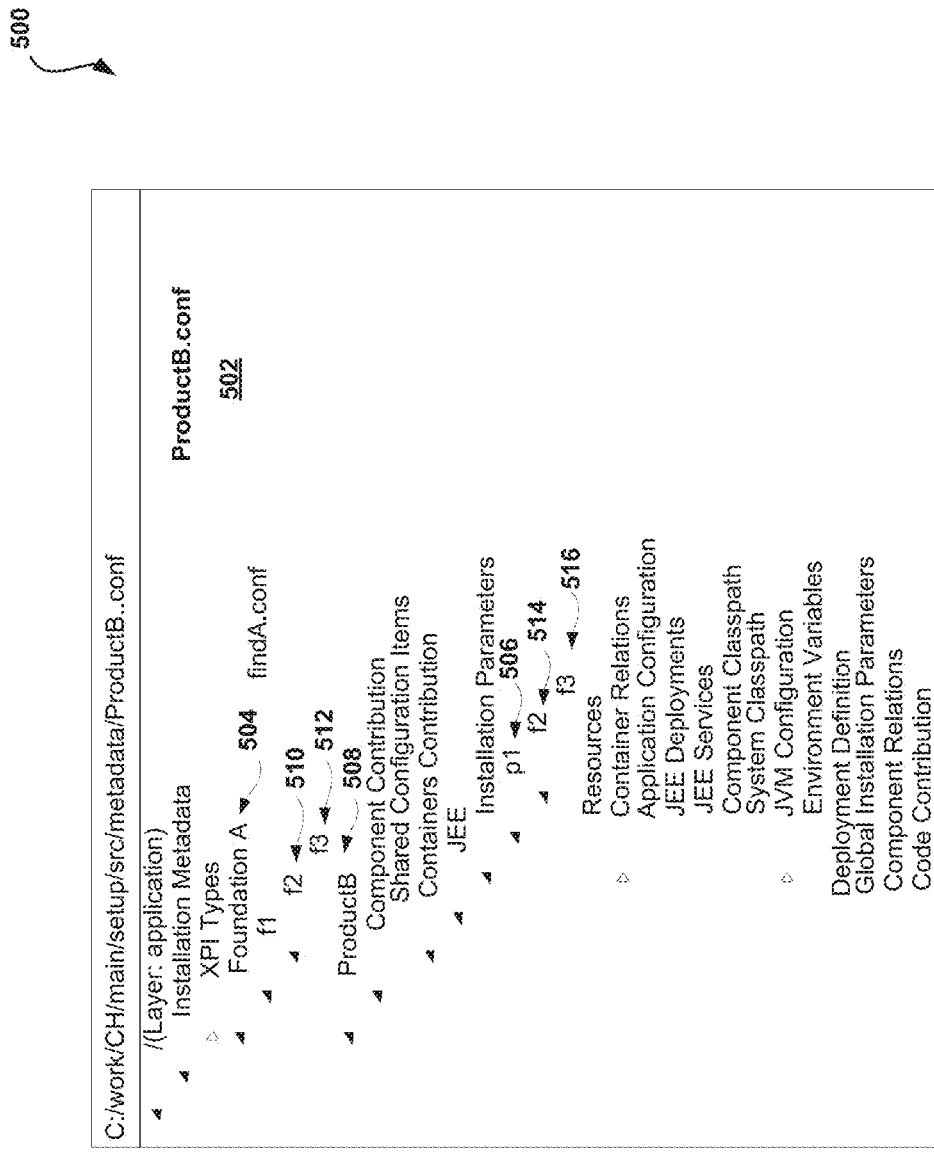
FIG. 5 illustrates a single configuration data tree generated from a plurality of source files, in accordance with one embodiment.

FIG. 5 illustrates a single configuration data tree 500 generated from a plurality of source files, in accordance with one embodiment. As an option, the configuration data tree 500 may be implemented in the context of the details of FIGS. 1-4. Of course, however, the configuration data tree 500 may be implemented in the context of any desired environment. Further, the aforementioned definitions may equally apply to the description below.

In the example depicted in FIG. 5, the root of the configuration tree originates from a first source file 502 ("productB.conf"), which has versions v1 and v2. In this example, a first node 504 ("FoundationA") originates from a second source file ("fndA.conf"), which has version u1 and u2.

A second node 506 (node "p1") under a third node 508 (node "ProductB"), inherits its child nodes from the first node 504 ("FoundationA"). In addition, the second node 506 (node "p1") was added only in version v2 of the first source file 502 ("productB.conf") and hence, in one embodiment, its existence condition may be (productB.conf in (v2)).

Further, in this example, a fourth node 510 (node "FoundationA/f1/f2") exists in both versions of the second source file ("fndA.conf"). Thus, in one embodiment, its existence condition may be (fndA.conf in (u1,u2)). However, a fifth node 512 (node "FoundationA/f1/f2/f3") was added only in the version u2 of the second source file ("fndA.conf"). Thus, its existence condition may be (fndA.conf in (u2)).

Continuing the example, an inherited node 514 (node "p1/f2") may have the combined existence condition ((productB.conf in v2) && (fndA.conf in (u1,u2))). Another node 516 (node "p1/f2/f3") may be associated with the condition ((productB.conf in v2) && (fndA.conf in (u2))). In one embodiment, if a user is interested in a configuration tree where productB.conf is in version v1 and fndA.conf is in version u2, then the node 506 ("p1") and its sub-tree may not be visible.

On the other hand, if the user is interested in the versioning context where productB.conf is v2 and fndA.conf is u1, then the node 506 ("p1") and its sub-tree may be visible (e.g. except the node p1/f2/f3). As described in the context of the example of FIG. 5, the depicted data structure may combine all the possible version permutations without duplicating any data. Of course, FIG. 5 and the accompanying description illustrate only one exemplary implementation of a configuration data tree.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:

identifying different versions of a plurality of source files, the source files including a plurality of configuration files;

merging the different versions of the plurality of source files to produce a single configuration data tree, where a single node in the single configuration data tree represents multiple additional nodes each from different versions of the plurality of source files and where the single node includes metadata indicating the different versions of the multiple additional nodes represented by the one node as well as a location of each of the different versions of the plurality of source files;

generating displayable data associated with the single configuration data tree;

identifying a modification to the single configuration data tree;

modifying one or more of the source files, in response to the modification to the single configuration data tree;

identifying a request to save the single configuration data tree; and creating a new source file based on the single configuration data tree, in response to the request to save the single configuration data tree.

2. The computer program product of claim 1, wherein the computer program product is operable such that the different versions of the plurality of source files are merged to produce the single configuration data tree without duplicated nodes associated with the different versions of the plurality of source files.

3. The computer program product of claim 1, further comprising computer code for identifying nodes that exist in at least one of the different versions of the plurality of source files.

4. The computer program product of claim 3, wherein the computer program product is operable such that the single configuration data tree includes the nodes that exist in at least one of the different versions of the plurality of source files.

5. The computer program product of claim 4, wherein the computer program product is operable such that the single configuration data tree includes values associated with the nodes that exist in at least one of the different versions of the plurality of source files.

6. The computer program product of claim 1, further comprising computer code for identifying duplicate nodes that exist in at least two of the different versions of the plurality of source files.

7. The computer program product of claim 6, further comprising computer code for merging data associated with the identified duplicate nodes that exist in the at least two of the different versions of the plurality of source files to produce the single configuration data tree.

8. The computer program product of claim 6, further comprising computer code for setting a condition associated with the identified duplicate nodes that exist in the at least two of the different versions of the plurality of source files to indicate at least one source file origin.

9. The computer program product of claim 6, further comprising computer code for setting a condition associated with the identified duplicate nodes that exist in the at least two of the different versions of the plurality of source files to indicate at least one value associated with the at least one source file origin.

10. The computer program product of claim 1, wherein the computer program product is operable such that identifying the different versions of the plurality of source files includes identifying a first source file associated with a first version and a second source file associated with a second version, the first source file associated with the first version being a different version of the second source file associated with the second version.

11. The computer program product of claim 10, further comprising computer code for identifying data associated with one or more first duplicate nodes that exist in the first source file associated with the first version and the second source file associated with the second version.

12. The computer program product of claim 11, further comprising computer code for creating one or more second nodes for the single configuration data tree, each of the one or more second nodes corresponding to a single merged node representing one of the one or more first duplicate nodes.

13. The computer program product of claim 12, wherein the computer program product is operable such that a condition of the one more second nodes indicates a source file location associated with the first source file and the second source file.

14. The computer program product of claim 10, further comprising computer code for identifying data associated with one or more first nodes that exist in only one of the first source file associated with the first version or the second source file associated with the second version.

15. The computer program product of claim 14, further comprising computer code for creating one or more second nodes for the single configuration data tree, each of the one or more second nodes corresponding to a single node representing the one or more first nodes.

16. The computer program product of claim 15, wherein the computer program product is operable such that a condition of the one more second nodes indicates a source file location associated with one of the first source file or the second source file.

17. The computer program product of claim 10, further comprising computer code for displaying data associated with the single configuration data tree including at least one of data corresponding to the first source file associated with the first version or data corresponding to the second source file associated with the second version, in response to a user input requesting to view the first version, the second version, or both the first version and the second version.

18. A method, including:
identifying different versions of a plurality of source files, the source files including a plurality of configuration files;

merging the different versions of the plurality of source files to produce a single configuration data tree, where a single node in the single configuration data tree represents multiple additional nodes each from different versions of the plurality of source files and where the single node includes metadata indicating the different versions of the multiple additional nodes represented by the one node as well as a location of each of the different versions of the plurality of source files;

generating displayable data associated with the single configuration data tree;

identifying a modification to the single configuration data tree;

modifying one or more of the source files, in response to the modification to the single configuration data tree;

identifying a request to save the single configuration data tree; and creating a new source file based on the single configuration data tree, in response to the request to save the single configuration data tree.

19. A system comprising:
a memory system; and
one or more processing cores coupled to the memory system and that are each configured to:
identify different versions of a plurality of source files, the source files including a plurality of configuration files;

merge the different versions of the plurality of source files to produce a single configuration data tree, where a single node in the single configuration data tree represents multiple additional nodes each from different versions of the plurality of source files and where the single node includes metadata indicating the different versions of the multiple additional nodes represented by the one node as well as a location of each of the different versions of the plurality of source files;

generating displayable data associated with the single configuration data tree;

identifying a modification to the single configuration data tree;

modifying one or more of the source files, in response to the modification to the single configuration data tree;

identifying a request to save the single configuration data tree; and creating a new source file based on the single configuration data tree, in response to the request to save the single configuration data tree.

* * * * *